United States Patent [19]

Schunck

[11] Patent Number: 5,460,857
[45] Date of Patent: Oct. 24, 1995

[54] METHOD OF PRODUCING DULL PAINT SURFACES

[75] Inventor: Stephan Schunck, Augsburg, Germany

[73] Assignee: BASF Lacke + Farben AG, Muenster-Hiltrup, Germany

[21] Appl. No.: 157,080

[22] PCT Filed: May 13, 1992

[86] PCT No.: PCT/EP92/01051
§ 371 Date: Feb. 1, 1994
§ 102(e) Date: Feb. 1, 1994

[87] PCT Pub. No.: WO92/21450
PCT Pub. Date: Dec. 10, 1992

[30] Foreign Application Priority Data

Jun. 7, 1991 [DE] Germany ............. 41 18 731.8

[51] Int. Cl.⁶ ............... B05D 3/06; B05D 5/06; B32B 3/00; B32B 27/00
[52] U.S. Cl. ............. 427/494; 427/500; 427/504; 427/167; 427/203; 427/204; 428/172; 428/216; 428/446; 428/452; 428/442
[58] Field of Search ............... 427/494, 496, 427/500, 408, 411, 163, 167, 170, 218, 219, 397.7, 387, 504, 204, 203; 428/446, 413, 442, 481, 482, 483, 537.1, 537.5, 172, 452, 213, 215

[56] References Cited

U.S. PATENT DOCUMENTS

| | | | |
|---|---|---|---|
| H1285 | 2/1994 | Toya | 430/569 |
| 3,785,850 | 1/1974 | Parker | 427/496 |
| 3,898,349 | 8/1975 | Kehr et al. | 427/496 |
| 3,918,393 | 11/1975 | Hahn | 427/494 |
| 4,358,476 | 11/1982 | Zimmer et al. | 427/494 |
| 4,399,213 | 8/1983 | Watanabe et al. | 430/523 |
| 4,455,359 | 6/1984 | Pätzold et al. | 430/10 |
| 5,085,911 | 2/1992 | Kato et al. | 427/508 |
| 5,102,737 | 4/1992 | Josephy et al. | 428/413 |
| 5,102,976 | 4/1992 | Kressdorf et al. | 528/272 |
| 5,271,988 | 12/1993 | Ikemoto et al. | 428/446 |
| 5,336,530 | 8/1994 | Ikemoto et al. | 427/498 |

OTHER PUBLICATIONS

*1984 Annual Book of ASTMS Standards*, Sec. 6, *Paints, Relates Coating and Aromatics\**, vol. 06.02 "Paint–Pigments, Resins & Polymers Exerpt" p. Designation D1483–60 and D1544–80 Philadelphia, Pa. 1984 (no month.

*Primary Examiner*—Marianne Padgett
*Attorney, Agent, or Firm*—Anne Gerry Sabourin

[57] ABSTRACT

The present invention relates to a method of producing dull surfaces, in which initially a first paint layer is applied in a first layer thickness and at least one second paint layer is then applied on top of the first paint layer, at least the paint layer applied last being provided with dulling agents and having a dry film layer thickness which is less than the average particle size of the dulling agent. The method is characterized in that the paint layers applied are cured by ionizing radiation.

13 Claims, No Drawings

METHOD OF PRODUCING DULL PAINT SURFACES

The present invention relates to a method of producing dull paint surfaces, in which initially a first paint layer is applied in a first layer thickness and at least one second paint layer is then applied on top of the first paint layer, at least the paint layer applied last being provided with dulling agents and having a dry film layer thickness which is less than the average particle size of the dulling agent.

To apply paint to various materials, especially furniture foils or chipboard, high-solids paints systems are predominantly used which are distinguished by particularly low pollution of the environment and by great economy of the painting devices used. Among such paints, the paint systems curable by UV radiation are of particular importance. However, paints are also known which are cured by ionizing radiation, in particular by electron beams. This method has the advantage over UV curing that even layers which contain hiding pigments can be cured within a short time to give hard coatings. In addition, the presence of photoinitiators is not necessary.

When using both the paints curable by UV radiation and those curable by ionizing radiation, high-gloss to silk-gloss coatings, having a degree of gloss of between 100 and 40 units according to DIN 67530 under an angle of observation of 60 degrees, can be produced without problems. By contrast, it is extraordinarily difficult to produce dull surfaces, which are demanded for many applications. These problems can not be overcome even by the usual methods of dulling paints by means of using highly disperse silicas or polyolefin powder, metal salts or mineral fillers.

This is true especially if coatings having a very high scratch resistance are to be produced, as is the case, for example, for coatings of furniture foils. To ensure high scratch resistance, the paint applied must, as is known, have a certain minimum layer thickness in order to ensure adequate mechanical stability of the paint layer. When producing dull surfaces, the difficulty therefore is that the dulling agents, because of their small particle diameter, sink to such a depth within the paint layer, in the case of an unduly large layer thickness, that they can no longer protrude from the surface and the desired dull appearance is therefore no longer produced.

In German Patent 3,721,071, a two-stage process is therefore proposed for producing dull surfaces, in which initially a first paint layer and then at least one second paint layer are applied, at least the paint layer applied last being provided with dulling agents. The paint layers are cured by means of UV radiation.

This procedure has, however, the disadvantage that, in the coating of impregnated or porous substrates such as, for example, decorative papers, filters, gypsum, concrete or the like, there is a considerable risk of uncured paint constituents (monomers, binders) remaining in the coating, which lead to emission problems and entail a deterioration in the surface quality. A further disadvantage is that it is necessary to apply a plurality of layers if relatively large overall layer thicknesses are to be obtained. Problems also arise if pigmented coatings are to be produced by this method. Finally, it is also a disadvantage that photoinitiators must be added to the coating agents for curing. Fragments and secondary products of the initiators also cause emission problems.

German Auslegeschrift 2,947,597 likewise describes a method of producing dull surfaces. In this method, a coating agent is applied and cured by subjecting the system to the successive combined action of ionizing radiation or UV radiation and of heat radiation or hot air until the entire film or coating has been cured. The disadvantage in this method is, however, that heat-sensitive substrates can be coated only with restrictions or not at all, since additional thermal curing of the coating agents is absolutely necessary in order to obtain the desired properties of the resulting coatings.

The greatest disadvantage is, however, that formaldehyde is eliminated in the curing of the coating agents, and this causes problems both in the curing of the coating compositions and in the further processing or use of the coated substrates. A final disadvantage is also the short pot life of these coating compositions.

The present invention is therefore based on the object of providing a method of producing dull surfaces, which does not have the disadvantages of the known methods and leads to coatings having good technical properties. In particular, the method should allow high processing speeds and be suitable for a wide variety of substrates, in particular also for difficult substrates such as, for example, porous and/or thermally sensitive substrates. The resulting coatings should show a high scratch resistance and the lowest possible content of uncured paint constituents. Moreover, the method should also be suitable for producing pigmented coatings.

Surprisingly, this object is achieved by a method of producing dull surfaces, in which initially a first paint layer is applied in a first layer thickness and at least one second paint layer is then applied on top of the first paint layer, at least the paint layer applied last being provided with dulling agents and having a dry film layer thickness which is less than the average particle size of the dulling agent.

The process is characterized in that the paint layers applied are cured by ionizing radiation.

The method according to the invention has the advantage that it allows dull and, if desired, colored surfaces to be produced, coupled with a high scratch resistance. In particular, the method also allows coating of difficult substrates, in particular coating of porous and/or heat sensitive substrates at high speed. The resulting coatings are distinguished, furthermore, by a low content of uncured paint constituents (monomer, binder) and freedom from formaldehyde. A further advantage is that even large overall layer thicknesses (about 150 $\mu$m) can be obtained with only 2 to 3 painting steps, whereas substantially more painting steps are necessary in UV-curing systems to obtain the same overall layer thicknesses. The method according to the invention will be explained in more detail below.

Dull and at the same time scratch-resistant surfaces are produced according to the method of the invention by using a multi-stage procedure. Initially, a first paint layer is applied in a first layer thickness. At least one second paint layer is then applied on top of the first paint layer, at least the paint layer applied last being provided with dulling agents.

In the paint layer or layers applied first, it is not yet important whether the particles of the dulling agents sink completely in the paint layer or protrude from the surface. This paint layer or these paint layers can therefore be selected solely from the aspect of high scratch resistance.

Usually, the dry film layer thickness of these paint layers is therefore the same or preferably greater than the dry film layer thickness of the paint layer applied last. Preferably, the dry film layer thickness of the first paint layer or—if more than two paint layers in total are applied—of the first paint layers is at least 3 $\mu$m.

To the first paint layer or paint layers, a further, last paint layer is then applied, whose layer thickness is selected such that a dull surface is produced in a desired manner. The dry film layer thickness of the last layer must therefore be less than the average particle size of the dulling agent. Preferably, the dry film layer thickness of the last paint layer is at least 2 μm. The dry film layer thickness of the overall structure, i.e. the total of the dry film layer thicknesses of all the paint layers applied, is preferably between 5 and 20 μm, but can also be considerably higher (=250 μm or even higher) depending on the intended application. With particular preference, only two paint layers in total are applied, in order to minimize in this way the effort of producing the coating and hence the costs.

Preferably, the so-called "wet-in-wet procedure" is used for applying the individual layers. This means that the next paint layer in each case is applied without fully curing the preceding paint layer. All paint layers are then fully cured together, so that crosslinking between the individual paint layers can also take place.

In this case, however, the overall layer thickness of the layer thicknesses [sic] to be cured should not be unduly large (in general ≦250 μm) in order to ensure complete cure throughout. At greater layer thicknesses, intermediate curing should therefore be carried out.

The method according to the invention can be carried out using the conventional, known painting apparatus. An apparatus which is constructed analogously to that described in German Patent 3,721,071, but differs from this apparatus in that the curing is effected not by UV radiation but by ionizing radiation, is also suitable.

The curing of the coating compositions is effected by means of conventional electron beam units. It is possible here to work with voltages of from less than 100 kV (in vacuo) up to 5,000 kV, but voltages between 150 and 500 kV are usual and preferred. Depending on the beam unit, the current intensities are in general 1 to 200 mA, 1 to 20 mA per m of width being preferred. Depending on the design and rating of the electron beam unit, the belt speeds are between 5 and 150 m/minute.

The application of the individual paint layers is carried out by the usual paint industry methods of spraying, brushing, dipping, casting and rolling. The method according to the invention is used for upgrading paper surfaces and for coating smooth and porous substrates, such as wood materials, wood, paper, cardboard, plastics, glass, mineral and ceramic materials and metals.

For use in the method according to the invention, those coating compositions are particularly suitable which contain A) 20 to 80% by weight of at least one ethylenically unsaturated polymeric resin, B) 10 to 60% by weight of at least one ethylenically unsaturated monomeric and/or oligomeric compound, C) if appropriate, 5 to 30% by weight, preferably 10 to 18% by weight, of at least one dulling agent, D) if appropriate, one or more adhesion promoters and E) auxiliaries and additives, the total of the contents by weight of each of the components A to E being 100% by weight.

The component A normally used is a mixture of $a_1$) 0 to 60% by weight, preferably 30 to 55% by weight, relative to the total weight of the coating composition (not relative to the weight of the component A, i.e. the total of the weight fractions $a_1$ to $a_4$ can be at most 80% by weight, relative to the total weight of the coating composition), of at least one polyether-acrylate, $a_2$) 0 to 12% by weight, preferably 3 to 7% by weight, relative to the total weight of the coating composition, of at least one acrylate copolymer, preferably having ethylenically unsaturated side chains, $a_3$) 0 to 35% by weight, preferably 15 to 23% by weight, relative to the total weight of the coating composition, of at least one polyester-acrylate and $a_4$) 0 to 15% by weight, preferably 7 to 15% by weight, relative to the total weight of the coating composition, of at least one epoxy-acrylate.

The polyether-acrylates used as component $a_1$ in the radiation-curable coating compositions are known per se. These polyether-acrylates usually have a double bond-equivalent weight of 1 to 7 mol/kg and a number-average molecular weight from 400 to 2,000.

They can be prepared by the most diverse methods, for example by reacting polyether-diols and/or polyether-polyols with acrylic and/or methacrylic acid or by etherifying hydroxyalkyl esters of acrylic or methacrylic acid. The preparation of these polyether-acrylates is, however, known to those skilled in the art and therefore does not need to be explained in more detail. With respect to the preparation of the polyether-acrylates by esterification of polyether-diols or -polyols with (meth)acrylic acid, reference is also made to German Offenlegungsschrift 3,316,593 and German Offenlegungsschrift 3,836,370, in which the reaction conditions and also suitable compounds are described in more detail.

An example of suitable, commercially available polyether-acrylates is, inter alia, the product obtainable from BASF AG under the name Laromer® 8812.

The acrylate copolymers having ethylenically unsaturated side chains, used as component $a_2$ in the radiation-curable coating compositions, are likewise known per se. They usually have a double bond-equivalent weight of 1 to 7 mol/kg and a number-average molecular weight from 400 to 2,500.

The acrylate copolymers can be produced, for example, by a two-stage process, in which a copolymer (I) is first prepared with the additional use of at least one ethylenically unsaturated monomer having at least one functional group, which copolymer is then reacted in a second stage with at least one compound which contains at least one ethylenically unsaturated double bond and a group which is reactive with the functional groups of the copolymer (I) prepared in the first stage.

The copolymer (I) can here be prepared by the usual polymerization methods, for example by free-radical solution polymerization at temperatures of in general 70° to 200° C. in the presence of an initiator and preferably in the presence of a polymerization regulator. Monomers having one or more ethylenically unsaturated double bonds [sic] are suitable for preparing the copolymer (I), at least some of these monomers having at least one functional group.

The monomers having at least one functional group can, for example, be ethylenically unsaturated carboxylic acids, in particular acrylic acid; ethylenically unsaturated monomers containing epoxide groups, in particular glycidyl esters of unsaturated carboxylic acids and/or glycidyl ethers of unsaturated compounds, such as, for example, glycidyl (meth)acrylate and monomers containing hydroxyl groups, such as, for example, hydroxyalkyl esters of (meth)acrylic acid. Moreover, monomers containing isocyanate groups or amino groups are also conceivable.

Suitable comonomers for these monomers having at least one functional group are in principle all ethylenically unsaturated compounds which lead to the properties desired in the particular case, such as, for example, alkyl esters of acrylic acid or methacrylic acid or of other ethylenically unsaturated carboxylic acids, vinyl-aromatic compounds, and the like.

The copolymers (I) are then reacted in a second stage with compounds which, in addition to at least one ethylenically unsaturated double bond [sic], also contain a group which is reactive with the functional groups of the copolymer. Depending on the nature of the functional groups of the copolymer, above all ethylenically unsaturated carboxylic acids, monomers containing epoxide groups and monomers containing hydroxyl groups are again used as such compounds.

Various commercially available products such as, for example, Ebecryl® 754 from UCB, Belgium are also suitable as component $a_2$.

The polyester-acrylates used as component as are also known per se. They usually have a double bond-equivalent weight of 1 to 5 mol/kg and a number-average molecular weight of 500 to 2,000.

The polyester-acrylates can be prepared in various ways. For example, acrylic acid and/or methacrylic acid can be additionally used as a constituent of the acid component in the build-up of the polyesters. Usually, however, the polyester-acrylates are prepared by reacting polyesters containing hydroxyl groups with acrylic acid and/or methacrylic acid. For further details regarding the preparation conditions and the compounds used, reference is merely made to the literature here. Thus, examples of suitable components as are the polyester-acrylates described in German Offenlegungsschrift 3,316,593 and in German Offenlegungsschrift 3,836,370.

Various commercially available products, for example Laromer® PE46 from BASF AG, are also suitable.

Finally, the epoxy-acrylates used as component $a_4$ are also known per se. They usually have a double bond-equivalent weight of 1 to 4 mol/kg and a number-average molecular weight of 400 to 1,500.

The epoxy-acrylates are usually prepared by reacting a compound containing epoxide groups, such as, for example, the diglycidyl ethers of bisphenol A, epoxide resins based on bisphenol A and the like, with acrylic acid and/or methacrylic acid.

Suitable epoxy-acrylates are described, for example, in Richard Holman, UV and EB curing, formulations for printing inks, coatings and paints, Sita Technology 203, Gardian House, Broonhill Road, London, SW18, ISBN 0947798021. The commercially available products, for example Laromer® EA81 from BASF AG, are also suitable.

As component B, the coating compositions usually contain 10 to 60% by weight of at least one ethylenically unsaturated monomeric and/or oligomeric compound. The components B used are above all esters of (meth)acrylic acid such as, for example, methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, octadecenyl (meth)acrylate and the corresponding esters of maleic acid, fumaric acid, tetrahydrophthalic acid, crotonic acid, isocrotonic acid, vinylacetic acid and itaconic acid. Preferably, monomers having more than 1 double bond per molecule are used, such as, for example, ethylene glycol diacrylate, diethylene glycol diacrylate, propylene glycol diacrylate, trimethylene glycol diacrylate, neopentyl glycol diacrylate, 1,3-butylene glycol diacrylate, 1,4-butylene glycol diacrylate, 1,6-hexamethylene glycol diacrylate, 1,10-decamethylene glycol diacrylate, trimethylolpropane triacrylate, pentaerythritol triacrylate, pentaerythritol tetraacrylate and the corresponding methacrylates. With very particular preference, tripropylene glycol diacrylate or alkylated, in particular ethoxylated and propoxylated, tripropylene glycol diacrylates are used.

If the coating composition is used for producing the last paint layer, it contains at least one dulling agent. However, the coating compositions used for producing the other paint layers can, but do not have to, contain at least one dulling gent. The quantity of dulling agent used is usually 5 to 30% by weight, preferably 10 to 18% by weight, in each case relative to the total weight of the coating composition.

Suitable dulling agents are all normally used dulling agents, for example silica.

Preferably, dulling agents having an average particle size of $\geq 1$ μm, preferably 1 to 4 μm and particularly preferably 2 to 3 μm, are used. For example, the commercially available products such as, for example, Syloid® 244 from Grace GmbH, Wesel, are also suitable.

If desired, the coating compositions can also contain in addition at least one adhesion promoter, preferably in a quantity of 0 to 3% by weight, particularly preferably 1.5 to 2.5% by weight, each relative to the total weight of the coating composition. In particular, so-called "acidic" adhesion promoters, i.e., for example, derivatives of phosphoric acid, are used.

For example, the following commercially available product, inter alia, is suitable: Ebecryl® PA 170 from UCB, Belgium.

Finally, the coating compositions can, if appropriate, also contain conventional auxiliaries and additives, preferably in a quantity of 1 to 7% by weight, particularly preferably 2 to 4.5% by weight, each relative to the total weight of the coating composition.

Examples of conventional additives are flash-off agents, wetting aids, anti-sedimentation agents, leveling agents and slip agents, and the like.

Furthermore, solvents which do not undergo crosslinking, such as, for example, aromatic hydrocarbons (xylene), esters (butyl acetate) and others, can also be used in small quantities, if appropriate, but the solvent content should not exceed 3 to 5% by weight, relative to the total weight of the coating composition. Preferably, however, solvent-free coating compositions are used.

Owing to the curing by means of ionizing radiation, the addition of photoinitiators is not necessary, whereby odor nuisances and the like are avoided. Furthermore, it is also possible to use pigmented (even hiding pigmented) coating compositions in the method. The pigment content of these pigmented coating compositions is usually between 10 and 28% by weight, preferably between 15 and 25% by weight, each relative to the total weight of the coating composition.

Examples of suitable pigments are titanium dioxide and other conventionally used pigments.

It is particularly advantageous if the coating compositions used for producing all the paint layers each have the same composition.

The invention will now be explained in more detail by reference to illustrative examples. All data regarding parts and percentages are here data by weight, unless explicitly stated otherwise.

EXAMPLE 1

A coating composition 1 was prepared by intimate mixing from the following components:

5.0 parts of a commercially available pure acrylate resin, as a 70% solution in hexanediol diacrylate (30% hexanediol diacrylate) (Ebecryl® 754 from UCB, Drogenbos, Belgium)

20.0 parts of a commercially available polyester-acrylate having a viscosity of 4–7 Pas at 23° C., an acid number of at most 5 mg of KOH/g, an iodine color number of at most 10 and an OH number of about 60 mg of KOH/g, as an 80% solution in tripropylene glycol diacrylate (Laromer® PE 46 from BASF AG, Ludwigshafen)

10.0 parts of a commercially available aromatic epoxy acrylate having a viscosity of 8–12 Pas at 23° C., an acid number of at most 5 mg of KOH/g and an OH number of about 160 mg of KOH/g, as an 80% solution in hexanediol diacrylate (Laromer® EA 81 from BASF AG, Ludwigshafen)

45.0 parts of tripropylene glycol diacrylate 2.0 parts of ethanol 0.6 part of a commercially available surface-active substance (Byk® 301 from Byk-Chemie GmbH, Wesel)

0.4 part of a commercially available anti-floating agent (Disperbyk® 160 from Byk-Chemie GmbH, Wesel)

0.4 part of a commercially available leveling agent (Efka® 777 from Esca Chemicals B.V.)

0.1 part of a commercially available wetting agent (Efka® 66 from Esca Chemicals B.V.)

14.5 parts of a commercially available dulling agent (Syloid® 244 from Grace GmbH, Worms)

2.0 parts of a commercially available adhesion promoter (Ebecryl® PA 170 from UCB, Drogenbos, Belgium).

This coating composition 1 was applied by means of roller application to a wood surface in a quantity corresponding to a dry film layer thickness of 15 µm. Immediately afterwards, this coating composition 1 was applied in a second layer (dry film layer thickness 3 µm). Both layers were then irradiated in an electron beam unit (ESI-ESH laboratory unit) with accelerated electrons of 150 kV voltage and 5 mA current intensity at a belt speed of 20 m/minute (=3 GW power), under an inert gas blanket.

This gives a hard, scratch-resistant paint film having a dull surface. The Gardner degree of gloss (angle of observation 60°) is about 20. The content of uncross-linked paint constituents in the resulting coating is less than 3% by weight, relative to the weight of the binders and monomers employed.

EXAMPLE 2

The coating composition 1 described in Example 1 was applied by means of roller application in two layers by the "wet-on-wet procedure" to impregnated paper sheets (thermally cured impregnation based on melamine resin, polyester and acid catalyst) and cured by electron beams as described in Example 1. The dry film layer thickness of the first layer is 15 µm, and that of the second layer 3 µm.

This gives a hard, scratch-resistant paint film having a dull surface. The Gardner degree of gloss (60°) is about 20. The content of uncrosslinked paint constituents in the cured coating is less than 3% by weight, relative to the weight of the binders and monomers employed.

EXAMPLE 3

A coating composition 2 was prepared by intimate mixing from the following components:

54.0 parts of a commercially available polyether-acrylate containing amine groups and having a viscosity of about 0.5 Pas at 23° C., an acid number of at most 2 mg of KOH/g and an OH number of about 30 mg of KOH/g (Laromer® LR 8812 from BASF AG, Ludwigshafen)

12.5 parts of a commercially available polyester-acrylate having a viscosity of 4–7 Pas at 23° C., an acid number of at most 5 mg of KOH/g and an OH number of about 60 mg of KOH/g, as an 80% solution in tripropylene glycol diacrylate (Laromer® PE 46 from BASF AG, Ludwigshafen)

15.5 parts of tripropylene glycol diacrylate 2.0 parts of ethanol 0.6 part of a commercially available surface-active substance (Byk® 301 from Byk-Chemie GmbH, Wesel)

0.4 part of a commercially available anti-floating agent (Disperbyk® 160 from Byk-Chemie GmbH, Wesel)

0.4 part of a commercially available leveling agent (Efka® 777 from Esca Chemicals B.V.)

0.1 part of a commercially available wetting agent (Efka® 66 from Esca Chemicals B.V.)

14.5 parts of a commercially available dulling agent (Syloid® 244 from Grace GmbH, Wesel [sic]).

This coating composition 2 was applied analogously to Example 1 in two layers by the "wet-in-wet procedure" to a wood surface and cured by means of electron beams. The dry film layer thickness of the first layer was 13 µm, and that of the second layer 4 µm.

This gives a hard scratch-resistant paint film having a dull surface. The Gardner degree of gloss (60°) is about 20. The content of uncrosslinked paint constituents in the cured coating is less than 3% by weight, relative to the weight of the binders and monomers employed.

EXAMPLE 4

The coating composition 2 described in Example 3 was applied in two layers by the "wet-in-wet procedure" to impregnated paper sheets (thermally cured impregnation based on melamine resin, polyester and acid catalyst) and cured by means of electron beams. The dry film layer thickness of the first layer is 13 µm, and that of the second layer 4 µm.

This gives a hard scratch-resistant paint film having a dull surface. The Gardner degree of gloss (60°) is about 20. The content of uncrosslinked paint constituents in the cured coating is less than 3% by weight, relative to the weight of the binders and monomers employed.

EXAMPLE 5

A pigmented coating composition 3 was prepared from the following components by intimate mixing:

25.0 parts of a commercially available polyester-acrylate having a viscosity of 4–7 Pas at 23° C., as an 80% solution in tripropylene glycol diacrylate (Laromer® PE 46 from BASF AG, Ludwigshafen)

10.0 parts of a commercially available aromatic epoxyacrylate having a viscosity of 8–12 Pas at 23° C. (Laromer® EA 81 from BASF AG, Ludwigshafen)

37.0 parts of tripropylene glycol diacrylate 20.0 parts of titanium dioxide of the rutile type 14.5 parts of a commercially available dulling agent (Syloid® 244 from Grace GmbH, Worms)

2.0 parts of ethanol 0.6 part of a commercially available surface-active substance (Byk® 301 from Byk-Chemie GmbH, Wesel)

0.4 part of a commercially available anti-floating agent (Disperbyk® 160 from Byk-Chemie GmbH, Wesel)

0.4 part of a commercially available leveling agent (Efka® 777 from Esca Chemicals B.V.)

0.1 part of a commercially available wetting agent (Efka® 66 from Esca Chemicals B.V.).

The pigmented coating composition 3 was applied analogously to Examples 1 and 2 by means of roller application in two layers to wood surfaces and impregnated paper sheets, and cured by means of electron beams. The dry film layer thickness of the first layer is 15 μm, and that of the second layer 3 μm.

This gives a hard scratch-resistant paint film having a dull surface. The content of uncrosslinked paint constituents in the cured coating is less than 3% by weight, relative to the weight of the binders and monomers employed.

I claim:

1. Method of producing coated surfaces by applying a radiation curable coating composition including dulling agents, comprising the steps of
   i) initially applying a coating composition, optionally including dulling agents, to form a first radiation curable paint layer to provide a dry film layer thickness of greater than or equal to 3μm, the coating composition consisting essentially of
      A) 20 to 80% by weight of a polymeric resin comprising a mixture of,
         $a_1$) at least one polyetheracrylate present in an amount up to 60% by weight, based on the total weight of the coating composition,
         $a_2$) at least one acrylate copolymer having ethylenically unsaturated side chains, present in an amount up to 12% by weight, based on the total weight of the coating composition,
         $a_3$) at least one polyesteracrylate present in an amount up to 35% by weight, based on the total weight of the coating composition, and
         $a_4$) at least one polyester arylate present in an amount up to 15% by weight, based on the total weight of the coating composition,
      B) 10 to 60% by weight of at least one compound selected from the group consisting of esters of acrylic acid and esters of methacrylic acid, esters of maleic acid, fumaric acid, tetrahydrophthalic acid, crotonic acid, isocrotonic acid, vinyl acetic acid and itaconic acid,
      C) optionally, 5 to 30% by weight of at least one dulling agent
      D) optionally, one or more adhesion promoters and
      E) optionally, additives,
   wherein, solvent, if present as one of the additives, is a non-crosslinking solvent and is used in an amount ≦5% by weight, and the total of the contents by weight of each of the components (A) to (E) being 100% by weight; and
   ii) applying a coating composition containing dulling agents to obtain a second radiation curable paint layer on top of the first paint layer said coating containing components A–E as set forth above, wherein component C), the dulling agent, is included in an amount between 5 and 30 percent by weight, and has a particle size of ≧1μ, the total of the contents by weight of each of the components (A) to (E) being 100% by weight, wherein, the second paint layer having a dry film layer thickness which is less than the average particle size of the dulling agent, and
   iii) curing the applied paint layers by ionizing radiation.

2. Method according to claim 1, wherein the dry film layer thickness of the paint layer applied last is equal to or less than a dry film layer thickness of the first paint layer.

3. Method according to claim 1, wherein the total of the dry film layer thicknesses of both applied paint layers combined is between 5 and 20 μm.

4. Method according to claim 1, wherein the dry film layer thickness of the second paint layer is greater than or equal to 2 μm.

5. Method according to claim 1, wherein the total of the dry film layer thicknesses of both the paint layers applied is between 5 and 20 μm and the dry film layer thickness of the first paint layer is equal to or greater than 3 μm and the dry film layer thickness of the second paint layer is greater than or equal to 2 μm.

6. Method according to claim 1, wherein the paint layer applied last includes a coating composition which contains at least one dulling agent having an average particle size of between 1 to 4 μm.

7. Method according to claim 1, wherein the first and second paint layers are crosslinked with one another.

8. Method according to claim 13, wherein the coating composition applied includes the ethylenically unsaturated polymeric resin (A), containing a mixture which includes
   $a_1$) 30 to 5% by weight, based on the total weight of the coating composition, of at least one polyetheracrylate, and members selected from the group consisting of
   $a_2$) 3 to 7% by weight, based on the total weight of the coating composition, of at least one acrylate copolymer, having ethylenically unsaturated side chains,
   $a_3$) 15 to 23% by weight, relative to the total weight of the coating composition, of at least one polyesteracrylate
   $a_4$) 7 to 15% by weight, relative to the total weight of the coating composition, of at least one epoxyacrylate, and mixtures thereof.

9. Method according to claim 1 wherein the paint layers are produced by applying a coating composition which includes an adhesion promoter (G), where said promoter is present in an amount up to 3.0% by weight.

10. Method according to claim 3, wherein coating compositions are applied which, include as the component B, compounds selected from the group consisting of tripropylene glycol diacrylate, alkylated tripropylene glycol diacrylate, and mixtures thereof.

11. Method according to claim 1, wherein the paint layers are produced by applying a coating composition to wood, wood materials or paper.

12. Method for coating a substrate according to claim 1, wherein component (B) is selected from the group consisting of esters of acrylic acid, and esters of methacrylic acid, wherein said esters have more than one double bond per molecule.

13. Method for coating a substrate with coating compositions containing dulling agents to provide mechanical stability and scratch resistance comprising,
   I. applying a non-aqueous coating composition to form a first coating layer, having a dry film layer thickness of greater than or equal to 3μm, said coating composition consisting essentially of
      A) 20 to 80% by weight of at least one ethylenically unsaturated polymeric resin comprising
         $a_1$) 30 to 55% by weight, based on the total weight of the coating composition, of at least one polyetheracrylate, and members selected from the group consisting of $a_2$) 3 to 7% by weight, based on the total weight of the coating composition, of at least one acrylate copolymer, having ethylenically unsaturated side chains selected from the group consisting of unsaturated carboxylic acids, ethylenically unsaturated monomers containing epoxide groups, and monomers containing hydroxyl groups, $a_3$) 15 to 23% by weight, relative to the total weight of the coating composition, of at least one polyesteracrylate, and $a_4$) 7 to 15% by weight, relative to the total weight of the coating composition, of at least one epoxyacrylate, and mixtures thereof;

B) 10 to 60% by weight of at least one compound selected from the group consisting of tripropylene glycol diacrylate, alkylated tripropylene glycol diacrylate, and mixtures thereof C) optionally, 5 to 30% by weight of at least one dulling agent, D) one or more adhesion promoters present in an amount up to 3.0% by weight and E) optionally, additives, the total of the contents by weight of each of the components (A) to (E) being 100% by weight; and II. applying a coating composition over the first coating layer to form a second coating layer, said coating comprising components A–E as defined above, wherein component C is present in an amount between 3 and 30% by weight has a dry film layer thickness which is less than the average particle size of the dulling agent; and III. curing the applied paint layers by ionizing radiation, wherein the cured coating has a Gardner degree of gloss (angle of observation 60°) of about 20.

\* \* \* \* \*